United States Patent [19]  [11] 4,453,922
Glaser  [45] Jun. 12, 1984

[54] CONTROL ASSEMBLY AND PROCESS FOR PRODUCING SAME

[75] Inventor: Kurt Glaser, Bad Vilbel, Fed. Rep. of Germany

[73] Assignee: Webasto-Werk W. Baier GmbH & Co., Munich, Fed. Rep. of Germany

[21] Appl. No.: 314,394

[22] Filed: Oct. 23, 1981

[30] Foreign Application Priority Data

Apr. 25, 1980 [DE] Fed. Rep. of Germany ....... 3015965

[51] Int. Cl.³ .......................... B60J 7/02; B32B 31/16
[52] U.S. Cl. ..................................... 464/57; 156/73.1; 296/223
[58] Field of Search ................. 49/223, 360; 156/73.1, 156/73.2; 296/223; 464/52, 57, 181, 183, 903

[56] References Cited

U.S. PATENT DOCUMENTS 3,444,701  5/1969  Randolph .......................... 464/57 X
3,863,979  2/1975  Bienert .............................. 49/360 X
4,056,274  11/1977  Jardin et al. ........................ 296/223
4,062,636  12/1977  Jardin et al. ..................... 296/223 X
4,081,926  4/1978  Jardin ............................... 296/223 X
4,356,926  11/1982  Priestly et al. ................. 156/73.1 X

FOREIGN PATENT DOCUMENTS 2433186  1/1976  Fed. Rep. of Germany ..... 156/73.1
129616  10/1979  Japan ................................... 296/223
1184268  3/1970  United Kingdom .

Primary Examiner—Stuart S. Levy
Assistant Examiner—Daniel P. Stodola
Attorney, Agent, or Firm—Antonelli, Terry & Wands

[57] ABSTRACT

A control assembly and process for producing same wherein an operating cable having a steel wire core is connected to a drive member, especially for motor vehicle sliding tops and window raising devices, that is made of plastic and has a sleeve formed thereon in which the core is secured by ultrasonic welding. In accordance with a modified embodiment, clamping rings are pressed onto the core on both sides of the sleeve providing tension and shear resistance to the connection of the sleeve and core, torsional forces being resisted by the ultrasonic welded connection.

5 Claims, 2 Drawing Figures

CONTROL ASSEMBLY AND PROCESS FOR PRODUCING SAME

BACKGROUND AND SUMMARY OF THE INVENTION

The invention relates to a control assembly consisting of an operating cable and a drive member, and to a process for the manufacture of a connection which resists the tensile and/or torsional forces applied between the drive member and the operating cable.

In control assemblies of this type the operating cable must be connected without play to the drive member. These assemblies are used especially in motor vehicle window raising means and sliding tops, as known for example from U.S. Pat. Nos. 4,056,274 and 4,081,926, and British Pat. No. 1,184,268. The drive member is usually made of plastic, and the operating cable comprises a core made of a plurality of wires twisted together and preferably covered with polyamide. The so-covered core is provided with a spiral winding of relatively thick and rigid wire, and a uniform spacing is maintained between adjacent wire turns. At the end of the operating cable a length of the core is free of wire winding, and this length is rigidly connected to the drive member. A drive pinion meshes between the wire turns and is rotated by a crank or a motor, especially an electric motor. The pinion is guided in the intervals between the wire turns as in a screw or worm. The operating cable of the control assembly is moved in the axial direction by the rotation of the pinion, and the drive member, mounted for example on a sliding top or on the frame of a window pane, is pulled or pushed. Therefore, the connection between the core of the operating cable and the drive member must absorb the tensile forces necessary to move the sliding top or window pane.

Together with the axial forces, the rotating pinion transmits tangential forces to the operating cable, and these forces are re-transmitted to the connection between the operating cable core and the drive member. Therefore the connection must resist this axial and radial double load for a long time.

The motion of a sliding top generally requires two parallel control assemblies to pull or push the sliding top simultaneously. To avoid sliding top deviations, the control assembly must be provided with high longitudinal precision and narrow tolerances in the connection between the operating cable core and the drive member. To date, this has entailed great difficulties, and known connections are unsatisfactory especially in respect to radial moment absorption.

According to the prior art, the connection between the operating cable core and drive member is produced so that the operating cable core is passed through a cylindrical sleeve of the drive member and provided with a stop block at the end which has been passed through. The block, mechanically crimped on the operating cable, is about 8 mm long and acts as a limit point for the tensile forces applied to the operating cable. Although the stop block application process frequently produces a degree of axial play between the operating cable and the sleeve, the necessary precision in the length of the connection is substantially obtained, and the tensile forces are absorbed. However, such stop blocks are not sufficient to prevent operating cable rotation in the sleeve of the drive member. To date, to oppose the radial moment, in addition to the use of a stop block, the end of the operating cable is adhesively bonded to the sleeve to provide a connection whose rigidity is sufficient so that the tangential forces are absorbed. But since the adhesive surface is exposed to continuous alternating stress, high grade, expensive adhesives must be used, for example cyanate-base adhesives. Preparation of the surface and careful processing are necessary to obtain a good connection. But even the best adhesive bond can separate. Finally, the double safeguard provided by the different connection means (adhesive and stop block) can be obtained only with an exactly adapted, multi-step process.

The object of the present invention is to provide a minimum-length tolerance control assembly with a play free, high load strength connection resistant to tension and/or torsion between the operating cable core, which is exposed to tensile, shearing, and torsional forces, and a drive member made of plastic. Another object is to achieve a process for the manufacture of such a connection with economy of material and, if need be, in a single operation.

The first part of this object is achieved in accordance with a preferred embodiment by a control assembly in which the core of the operating cable is welded to the drive member sleeve in tension and/or torsion resistant conditions.

The characteristic feature of the process for the production of the connection between the plastic drive member and the core wire of the operating cable consists in the ultrasonic welding of the two parts. In an especially advantageous embodiment of the process the drive member is mechanically compressed with the operating cable core during the ultrasonic welding operation.

The process of the invention results in a reliable connection which is eminently superior to conventional control assemblies in respect to axial and transverse stress resistance. The process eliminates the use of high cost adhesives and in some cases also of the heretofore necessary end block. An extremely strong connection resisting all shearing, tensile, and radial forces is provided between the operating cable and the drive member.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
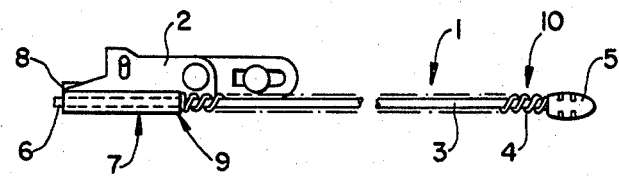
FIG. 1 is a side view of a connection produced according to the invention for the control assembly of a motor vehicle sliding top.

The control assembly of FIG. 1 consists of an operating cable 1 and a drive member 2. Operating cable 1 comprises a core 3 made of intertwined individual steel wires or filaments. Core 3 is provided with a spiral winding 4 made of a single, relatively thick wire. Uniform spacing is maintained between each of the individual winding turns. One end of the wire of spiral winding 4 is clinched to core 3. A mechanically clinched end block 5 firmly connects core 3 to the wire of spiral winding 4, and also constitutes the fastening point of a single hookup unit in the motor vehicle top (not shown) in which the control assembly is mounted. The opposite end of core 3 is free of wire spiral winding 4, and the free portion 6 of core 3 is introduced in a cylindrical sleeve 7 formed on drive member 2. Free portion 6 can extend beyond the end face 8 of sleeve 7, or remain inside sleeve 7. Wire spiral winding 4 extends on core 3 to the opposite inner end face 9 of sleeve 7, and 1-3 turns thereof are brazed onto core 3. Core 3 is suitably flocked with polyamide fibers, to fill the spaces 10 between the turns of the spiral winding, and the brush-like fiber layer projects by a short distance from the periphery of the spiral winding. The polyamide fiber layer reduces the friction of the built-in control assembly in the automobile top, but does not hinder the penetration of the crank or motor driven pinion (not shown) into spaces 10.

As well as sleeve 7 formed thereon, drive member 2 is made of any plastic material capable of being ultrasonically welded. Operating cable core 3 is introduced into a fitting median opening in the sleeve 7 of drive member 2. The two components are placed together within the radiation range of an ultrasonic source. The energy transmitted by the ultrasonic source softens the plastic so that it can penetrate the spaces between the individual steel wires or filaments of core 3. A die (not shown) provided in the ultrasonic welder is pressed onto the portion of the sleeve 7 of drive member 2 to be welded. The ultrasonic waves travel in this portion into the plastic of sleeve 7, which liquefies. The liquefied plastic material which surrounds core 3 penetrates the twined wires of core 3, solidifies, and provides an excellent connection which resists all loads and applied forces.

Consequently, sleeve 7 is plasticized predominantly on the inside by the ultrasonic treatment, and united with the core 3 of operating cable 1.

The quality of the connection can be improved by mechanical pressure on sleeve 7 to force the plastic into the surface of core 3 during the ultrasonic irradiation. The die is suitably used also as pressing tool. The ultrasonic source may be a probe which is used also as pressing die.

Figure 2:
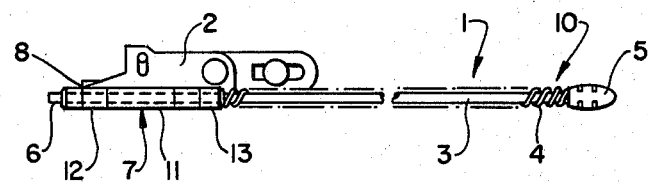
FIG. 2 is a side view similar to that of FIG. 1, but representing a modified embodiment of the invention.

While in the embodiment of FIG. 1 ultrasonic welding provides for a connection of sleeve 7 and core 3 which is resistant to tensile and torsional forces, FIG. 2 represents a modified embodiment in which an ultrasonic weld 11, extending only along a portion of the length of sleeve 7, only performs the function of preventing torsion between sleeve 7 and core 3. The necessary tension and shear resistance of the connection of sleeve 7 and core 3 is derived from clamping rings 12 and 13 pressed on core 3 on both sides of sleeve 7. With the exception of the shortening of sleeve 7 and the addition of clamping rings 12 and 13, the FIG. 2 embodiment is otherwise constructed the same as the FIG. 1 embodiment.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. A control assembly, especially for motor vehicle sliding tops and window raising means, comprising a drive member and an operating cable having a core formed of a plurality of individual steel wires that are intertwined with spaces formed between the individual wires, a relatively thick wire being spirally wound about said plurality of intertwined wires for engagement with a drive pinion, wherein said spirally wound wire is secured to said plurality of intertwined wires in a manner leaving an end portion of said core free of the spirally wound wire, and wherein said drive member has a sleeve made of plastic, said end portion of the core being received within the plastic sleeve with the spirally wound wire terminating in the vicinity of an inlet end portion of said plastic sleeve, said end portion of the core being bonded thereto by an ultrasonic plastification of the sleeve that results in the plastic material of the sleeve surrounding the core and penetrating said spaces between the individual intertwined wires thereof wherein a connection that is resistant to at least torsional forces acting between the sleeve and the core is formed.

2. A control assembly according to claim 1, wherein clamping rings are pressed onto the core at opposite sides of said sleeve for providing tension and shear resistance to the connection of the sleeve and core.

3. A process for producing a connection between a drive member having a sleeve made of plastic and an operating cable having a core comprised of a plurality of individual steel wires that are intertwined with spaces formed between the individual wires and a relatively thick wire spirally wound about the intertwined wires for engagement with a drive pinion, especially for motor vehicle sliding tops and window raising means, wherein said spirally wound wire is secured to the intertwined wires so as to leave an end portion of the core free of the spirally wound wire, said end portion is inserted into said sleeve, with the spirally wound wire terminating in the vicinity of an inlet end portion of the plastic sleeve, and is subsequently bonded thereto by ultrasonically plasticizing the plastic material of the sleeve in a manner causing the plasticized material to surround the core and penetrate into the spaces between the individual intertwined wires, said plastic material being solidified so as to form a connection between the drive member and the operating cable that is resistant to at least torsional loads therebetween.

4. The process as in claim 3, characterized in that the sleeve of the drive member is pressed onto the core of the operatng cable during the ultrasonic irradiation operation.

5. The process of claim 3 or 4, wherein clamping rings are pressed on the core on both sides of the sleeve for providing tension and shear resistance to the connection of the sleeve and core.

* * * * *